Figure 1:
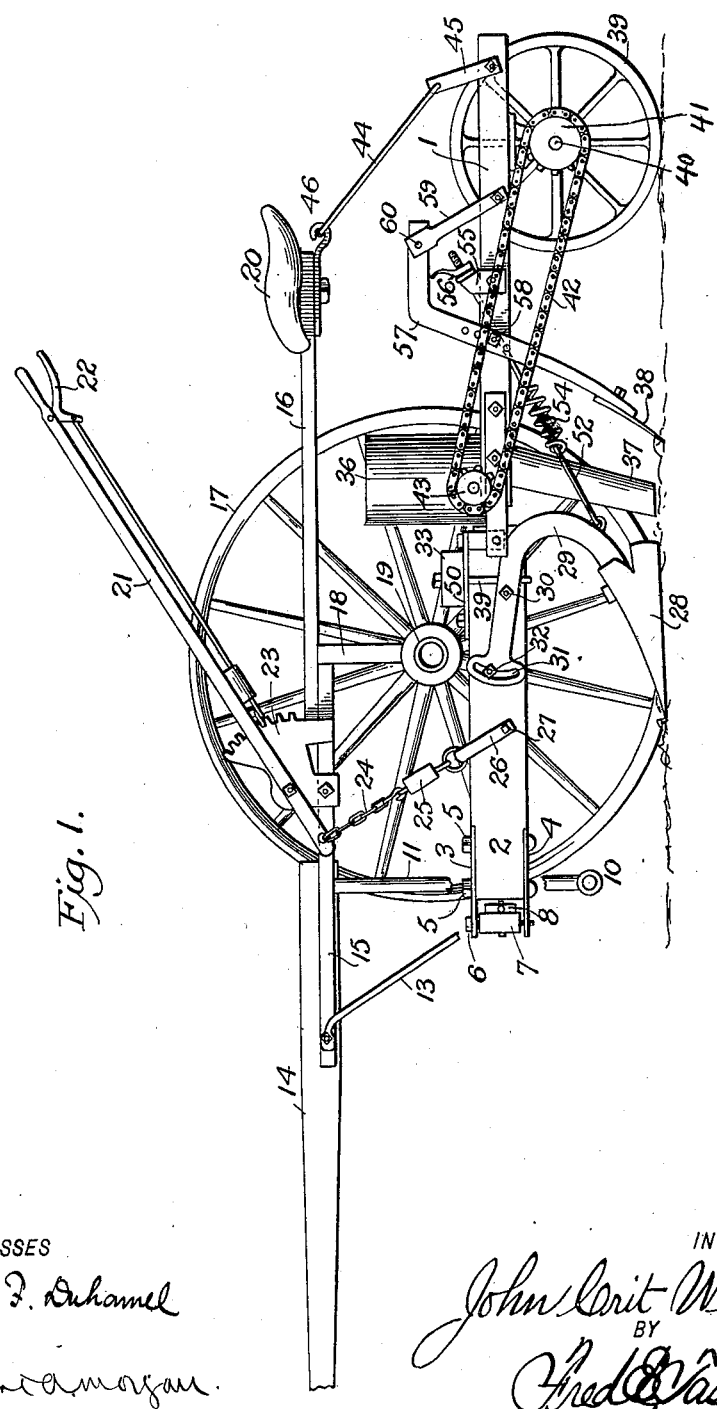

No. 644,308. Patented Feb. 27, 1900.
J. C. WEDDLE.
PLANTING ATTACHMENT FOR CULTIVATORS.
(Application filed Apr. 19, 1899.)

(No Model.) 2 Sheets—Sheet 1.

WITNESSES
James F. Duhamel
Robert A. Morgan

INVENTOR
John Crit Weddle
BY
Fred E. Tasker
ATTORNEY

No. 644,308. Patented Feb. 27, 1900.
J. C. WEDDLE.
PLANTING ATTACHMENT FOR CULTIVATORS.
(Application filed Apr. 19, 1899.)
(No Model.) 2 Sheets—Sheet 2.
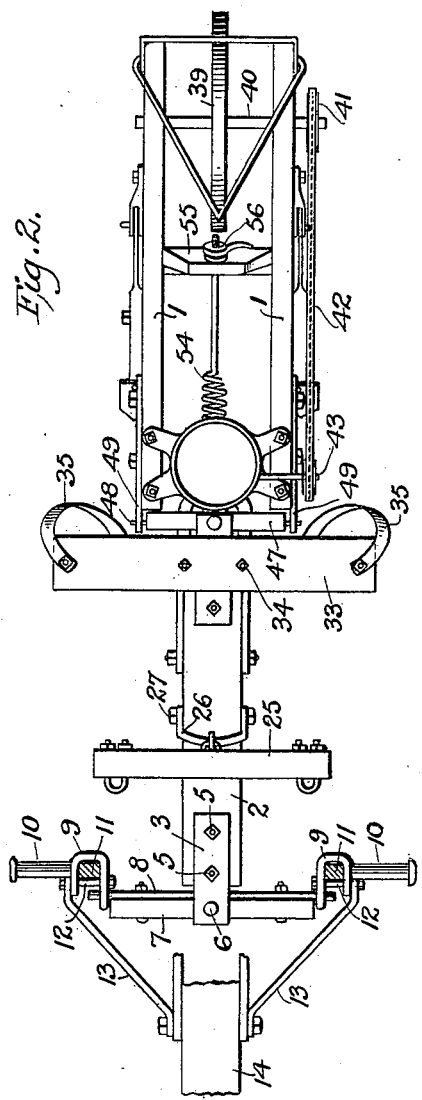
WITNESSES
James F. Duhamel
Robert A. Morgan
INVENTOR
John Crit Weddle,
BY
Fred G. Dieterich
ATTORNEY

UNITED STATES PATENT OFFICE.

JOHN CRIT WEDDLE, OF TAYLOR, TEXAS.

PLANTING ATTACHMENT FOR CULTIVATORS.

SPECIFICATION forming part of Letters Patent No. 644,308, dated February 27, 1900.

Application filed April 19, 1899. Serial No. 713,607. (No model.)

*To all whom it may concern:*

Be it known that I, JOHN CRIT WEDDLE, a citizen of the United States, residing at Taylor, in the county of Williamson and State of Texas, have invented certain new and useful Improvements in Corn and Cotton Planting Attachments for Cultivators; and I do hereby declare the following to be a full, clear, and exact description of the invention, such as will enable others skilled in the art to which it appertains to make and use the same.

My invention has reference to a corn and cotton planting attachment for cultivators, the object thereof being to provide simple, complete, and efficient mechanism that can easily be applied to or removed from the ordinary cultivator construction for the purpose of providing planting means; and the invention therefore consists, essentially, in the construction, arrangement, and combination of parts and in certain details thereof, substantially as will be hereinafter described and claimed.

In the annexed drawings, illustrating my invention, Figure 1 is a side elevation of my improved corn and cotton planting attachment for cultivators, the parts being represented as arranged for practical operation. Fig. 2 is a top plan view of the same with certain parts removed. Fig. 3 is a partial plan view showing the particular relative location of certain of the parts. Figs. 4, 5, and 6 represent structural details.

Like numerals of reference designate corresponding parts throughout the different figures of the drawings.

The frame of my improved planting attachment for cultivators, plows, and similar machines consists, essentially, of two parts, the front section and the rear section, which are easily and quickly connected together or disconnected from each other. 1 denotes the frame of the rear section, which is of a generally-rectangular form, and 2 the frame of the front section, the same consisting of a single horizontal and forwardly-extending beam. The rear frame 1 carries the seedbox 36, whose feet or attaching-legs are bolted to the sides of the frame 1, as clearly represented in Fig. 2. Rear frame 1 also supports the seed-chute 37, which is arranged below the box 36 with its mouth contiguous to the ground. Rear frame 1 also sustains the coverers 38 and the ground-wheel 39. The shaft 40 of wheel 39 is journaled in suitable hangers or standards affixed to the frame 1, as shown in Fig. 1, and on this shaft 40, outside of the frame 1, is a sprocket-wheel 41, around which passes the drive-chain 42, that likewise engages and actuates the seedbox sprocket-pinion 43. The front section of the frame—that is to say, the horizontal beam 2—carries the plow 28 and the connections whereby the whole device is attached to the cultivator. At the extreme front end of beam 2 is an upper plate 3 and an under plate 4, both of which project forwardly beyond the end of the beam 2 and are provided with circular orifices or openings to receive and contain a retaining-bolt 6. The plates 3 and 4 are secured to beam 2 by means of the bolts and nuts 5 5. The bolt 6 passes through a transverse horizontal bar 7, which is situated between the upper and lower plates 3 and 4, as shown in Fig. 1, said bolt 6 serving as a pivot on which the bar 7 can oscillate. To the rear edge of the bar 7 is bolted a thinner and smaller bar 8, whose extremities enter perforations or apertures in the clamps 9 9, said extremities of the bar 8 providing round journal-pins, and thus effecting hinged connections with the said clamps 9, so that the clamps may have a vertical oscillation on the pivot-pins thus provided. Clamps 9 9 embrace the sides of the arching iron 11, which is a piece of the cultivator mechanism proper, the said clamps being firmly bound or applied to the arch 11 by means of the bolts 12 12. On the lower ends of the arching iron 11 are the horizontal angle projections 10 10, to which the cultivator-beams are adapted to be clamped when the cultivator is employed for its usual and distinctive purpose. From the foregoing explanation of the arrangement of the parts it will be seen that a horizontal oscillation is permitted on the pivot 6 and vertical oscillations on pivots at the ends of the bar 8, whereby a double hinge working in two directions is provided and the free play of the whole construction is admitted of.

Rigidity and firmness in a contrivance for attaching the planting mechanism to the cultivator mechanism are more effectively achieved by use of the braces 13 13, running from the outer ends of the bolts 12 12 forwardly and upwardly to the parallel sides of the tongue 14 of the cultivator, where they are firmly bolted thereto by means of some suitable bolt-and-nut device.

25 indicates a strong horizontal beam or bar provided at its opposite ends with staples and also with a third central staple. The end staples are furnished with chains or straps 24 24, which connect with the lower ends of the upper levers 21 21. The central staple on the beam 25 connects loosely with a clevis 26, which is bolted to the beam 2 by means of some suitable bolt-and-nut device. Each of the levers 21 is furnished with a catch device 22, that engages the notched sector 23, bolted firmly on the frame of the cultivator, whereby the lever 21 can be secured at any desired point of adjustment.

In addition to the arched iron bar 11, already spoken of, the cultivator-frame proper comprises the upper seat-frame 16, on which is mounted the seat 20 for the driver or operator of the machine. Below the frame 16 depend the vertical standards 18, carrying the journals under the hubs 19 of the large wheels 17 17. Running forwardly from the seat-frame 16 are side bars 15, that are secured to the tongue 14 by the same bolts that pass through the braces 13, all as clearly shown in Fig 1. Of course it will be understood that the exact construction of the cultivator-frame and its parts may vary considerably without departing from my invention, which is intended to be applied to cultivator constructions of various kinds. It is also to be perceived that when the operator is seated at 20 he can readily take hold of and depress the lever or levers 21, thereby lifting the beam 2 and raising the plow 28 from the ground to a greater or less distance. This same movement which lifts the plow 28 will likewise lift the rear section, which I have already partially described and which operatively supports the seedbox, ground-wheel, coverers, seed-chute, and other parts, and the operator after depressing the lever or levers 21 can reach down behind his seat and lay hold of the bent rod 44, which engages arms 45, that are bolted securely to the frame 1 near its rear extremity, and by pulling said rod 44 upward can bring the rear section 1 and its appurtenant parts to a level position and keep the same there by attaching the rod 44 to the hook 46 on the end of the seat-frame 16, below the seat 20, by which means the whole device is readily and quickly suspended above ground in a convenient position for transportation or for turning or reversing the mechanism around the return furrow.

The plow, sweep, or blade 28 is operatively applied to a bifurcated standard 29 at its curved lower end, the upper ends of which standard separate, so as to embrace the beam 2 near its rear extremity, and these forks are secured to said beam 2 at two points, at one point by means of the bolt 30 for the purpose of furnishing a hinge-like motion at said point, and at another point by means of a bolt 32, that passes through an elongated slot 31 in the end of each of the forks of the plow-standard, as is represented in Fig. 1, said bolt 32 having a tap by operating which the extremities of the aforesaid forks may be fixed at any desired point of elevation or depression within the adjusting limits of the slot. This particular style of supporting the plow or sweep is to enable the angle made by the lower surface of the plow with the surface of the ground to be changed, regulated, or adjusted.

A horizontal transverse beam 33 is securely fastened at right angles across the top of the forward beam 2, at the rear extremity of the latter, by means of a stirrup-clamp 34. Either end of this beam 33 is furnished with an oblique stirrup or foot-strap 35, said straps being adapted to receive the foot of the operator, who is seated on the seat 20, and who thereby controls the lateral movements of the mechanism.

I will now describe the means whereby the rear frame 1 is movably connected with the front beam 2, so as to admit of a free movement vertically and horizontally by providing a joint that swivels in both directions.

A horizontal cross-bar 47, consisting of a thin flat piece of metal which is bent downwardly at a right angle at each end, is situated at the rear end of the beam 2. The angular ends of this flat bar 47 are provided with the horizontal projecting integral journals 48 48, that enter loosely perforations in the extremities of the flat side bars 49 49, that are secured to the sides of the frame 1. (See Figs. 2, 5, and 6.) On the top of the rear end of the beam 2 is a flat plate 50, projecting rearwardly beyond the extremity of the beam and perforated to receive a vertical bolt 51, which passes not only through plate 50, but also through the cross-piece 47 and the beam 2, and thus provides a pivot on which the rear frame 1 and the front beam 2 may interrelatively swing. While horizontal motion is secured by means of this pivot, a vertical oscillation is secured by means of the journals 48 48, already described.

The chute or delivery-spout 37, through which seed passes from the seed-hopper 36 for distribution into the furrow, lies within a strong rectangular, circular, or other shaped iron frame 52, which is shown in Fig. 3. The front part of said frame is connected with a short cross-rod 53 in the rear of the bifurcated footpiece or standard 29, that carries the plow 28. The rear part of the aforesaid iron frame 52 has connected thereto a strong spiral spring 54, which in its turn connects or is formed with a rod that extends rearwardly and upwardly in an inclined direction, passing through a cross-bar 55, that is connected to the opposite parallel sides of the frame 1, as shown in Fig. 2, at which point there is a thread on the rod and a hand-tap 56. By this means the rear section 1 of the planting attachment is braced from below with the lower part of the strong standard and a firm pressure of the ground-wheel 39 is secured. When the sections of the machine are to be disconnected from each other, the spring-rod just described can be cast loose by unscrewing the hand-tap at 56.

The coverers 38, which have already been mentioned, are bolted on the lower ends of the coverer-standards 57, which extend obliquely upward and are secured to the outer edges of the rear frame 1 by means of the bolts and taps 58. Additional perforations are made in the standards 57 to admit of their adjustment in the elevation or depression of the mechanism. The upper ends of the standards 57 are bent horizontally rearward and enter the bifurcated or cleft upper ends of the oblique standards 59 59, which are secured at their lower ends by means of bolts and taps to the sides of the frame 1. Through the prongs of the bifurcated upper end of the standards 59 and the intervening part of the coverer-arms 57 passes a wooden peg 60, which is intended to be broken whenever the coverer-plows encounter an obstruction that would otherwise cause the breakage of another part.

Many changes may be made in the precise construction, arrangement, and application of the numerous parts of my present mechanism, and I reserve the liberty of so modifying and rearranging as may be necessary to best suit the invention to the needs of actual use, it being borne in mind all the while that the proper limits of the ensuing claims shall not be exceeded. It will be noted that when the rear section of the machinery is removed and the parts shown in Fig. 3 are left, together with the cultivator mechanism proper, a riding-plow of extraordinary efficiency and means of operation will be provided, which plow will present manifest advantages to those skilled in a knowledge of the art to which this invention pertains.

Having thus described my invention, what I claim as new, and desire to secure by Letters Patent, is—

1. In a corn and cotton planting attachment for cultivators, the combination of the front frame carrying a plow or sweep, a rear frame supporting a seedbox and a ground-wheel, means for throwing the plow and planting mechanism out of operation, and means for making a movable connection between the two frames.

2. The combination of the front section carrying a plow, the cultivator-frame to which said front section is connected in a doubly-pivoted manner, lifting means for adjusting the height of said section from the ground, lifting mechanism for the planting-section, and the seat-supporting frame whereby the operator rides upon the machine, substantially as described.

3. The combination with the cultivator-frame having drive-wheels, of the front frame of a planter attachment, said frame carrying an adjustable plow or sweep, means for connecting said frame in a double pivotal manner with the cultivator-frame, means for guiding the mechanism from the driver's seat, a spring connecting the plow and planting attachment to normally hold the latter in contact with the ground, lifting mechanism for adjusting the height of the parts from the ground, a seat-carrying frame, and a stirrup-provided guiding device mounted transversely upon the plow-carrying frame, substantially as described.

4. The combination with a cultivator-frame, of a planter attachment consisting essentially of a front frame supporting the plow, means for hinging said frame at its forward end to the cultivator-frame in a double pivotal manner, the rear frame carrying the ground-wheel, a seed-distributer, a delivery-chute and coverer-plows, means for making a double pivotal connection between the front and rear frame, a seat-carrying frame, a spring connecting the planting-frame with the cultivator-frame to normally draw the former toward the ground, and means for supporting the rear end of the rear frame from the seat-carrying frame, substantially as specified.

5. In a corn and cotton planting attachment for cultivators, the combination of the front frame or beam carrying an adjustable plow, means for doubly pivoting the end of the front frame to the cultivator-frame, and a rear frame carrying the seed-dropping devices together with a spring connection between said frame and the plow or sweep, to normally hold the planting mechanism in contact with the ground, substantially as described.

6. In a corn and cotton planting attachment for cultivators, the combination with a front section carrying a plow and pivotally supported on the cultivator-frame, of a rear section carrying a seed-distributing device, and coverers, together with means for operating the seed-distributer, a spring connection between the plow and planter to normally hold the latter in contact with the ground, and leverage means for lifting and sustaining the sections of the machine for convenience in transportation, substantially as described.

In testimony whereof I affix my signature in presence of two witnesses.

JOHN CRIT WEDDLE.

Witnesses:
HENRY OBERMILLER,
JNO. W. COX.